United States Patent
Miyatake et al.

(10) Patent No.: US 10,727,515 B2
(45) Date of Patent: Jul. 28, 2020

(54) ANION EXCHANGE RESIN, ELECTROLYTE MEMBRANE, BINDER FOR FORMING ELECTRODE CATALYST LAYER, FUEL CELL ELECTRODE CATALYST LAYER AND FUEL CELL

(71) Applicants: UNIVERSITY OF YAMANASHI, Yamanashi (JP); TAKAHATA PRECISION CO., LTD., Yamanashi (JP)

(72) Inventors: Kenji Miyatake, Yamanashi (JP); Junpei Miyake, Yamanshi (JP); Hideaki Ono, Yamanashi (JP); Manai Shimada, Yamanashi (JP); Naoki Yokota, Yamanashi (JP); Natsumi Yoshimura, Yamanashi (JP); Aoi Takano, Shiga (JP); Koichiro Asazawa, Shiga (JP); Eriko Nishino, Shiga (JP); Yui Kuwabara, Shiga (JP)

(73) Assignees: UNIVERSITY OF YAMANASHI, Kofu-Shi, Yamanashi (JP); TAKAHATA PRECISION CO., LTD., Fuefuki-Shi, Yamanashi (JP)

( * ) Notice: Subject to any disclaimer, the term of this patent is extended or adjusted under 35 U.S.C. 154(b) by 108 days.

(21) Appl. No.: 16/044,004

(22) Filed: Jul. 24, 2018

(65) Prior Publication Data
US 2019/0027768 A1 Jan. 24, 2019

(30) Foreign Application Priority Data

Jul. 24, 2017 (JP) .................. 2017-143136

(51) Int. Cl.
| | | |
|---|---|---|
| *H01M 8/10* | (2016.01) | |
| *H01M 4/86* | (2006.01) | |
| *C08J 5/22* | (2006.01) | |
| *H01M 8/1023* | (2016.01) | |
| *H01M 8/1018* | (2016.01) | |

(52) U.S. Cl.
CPC ........... *H01M 8/1023* (2013.01); *C08J 5/225* (2013.01); *C08J 5/2231* (2013.01); *C08J 5/2262* (2013.01); *H01M 4/8668* (2013.01); *C08J 2365/00* (2013.01); *H01M 2008/1095* (2013.01)

(58) Field of Classification Search
CPC ............. H01M 8/1023; H01M 4/8668; H01M 2008/1095; C08J 5/225; C08J 5/2231; C08J 5/2262; C08J 2365/00
USPC .......................................... 521/27
See application file for complete search history.

(56) References Cited

U.S. PATENT DOCUMENTS

| | | | | |
|---|---|---|---|---|
| 7,973,088 B2* | 7/2011 | Ikeuchi | ................... | C08J 5/2256 204/192.33 |
| 2009/0117438 A1* | 5/2009 | Saito | ..................... | H01M 8/106 429/493 |
| 2012/0238648 A1* | 9/2012 | Zhou | ........................ | B01J 49/00 521/27 |

FOREIGN PATENT DOCUMENTS

JP  2016-044224 A  4/2016

OTHER PUBLICATIONS

Lin et al. "A Soluble and Conductive Polyfluorene Ionomer with Pendant Imidazolium Groups for Alkaline Fuel Cell Applications", Macromolecules 2011,44, 9642-9649. (Year: 2011).*

Ono et al. "Robust anion conductive polymers containing perfluoroalkylene and pendant ammonium groups for high performance fuel cells", Journal of Materials Chemistry A: Materials for Energy and Sustainability (2017), 5(47), 24804-24812. (Year: 2017).*

* cited by examiner

*Primary Examiner* — Michael Bernshteyn
(74) *Attorney, Agent, or Firm* — Masuvalley & Partners

(57) ABSTRACT

An anion exchange resin capable of producing an electrolyte membrane, a binder for forming an electrode catalyst layer and a fuel cell electrode catalyst layer, which have improved electrical properties; an electrolyte membrane and a binder for forming an electrode catalyst layer produced from the anion exchange resin; and a fuel cell having the electrolyte membrane or the electrode catalyst layer.

13 Claims, 2 Drawing Sheets

ANION EXCHANGE RESIN, ELECTROLYTE MEMBRANE, BINDER FOR FORMING ELECTRODE CATALYST LAYER, FUEL CELL ELECTRODE CATALYST LAYER AND FUEL CELL

RELATED APPLICATIONS

This application claims priority to Japanese Patent Application No. JP2017-143136, filed Jul. 24, 2017, entitled Anion Exchange Resin, Electrolyte Membrane, Binder For Forming Electrode Catalyst Layer, Fuel Cell Electrode Catalyst Layer And Fuel Cell, which is incorporated herein by reference in its entirety.

TECHNICAL FIELD

The present invention relates to an anion exchange resin, an electrolyte membrane, a binder for forming an electrode catalyst layer, a fuel cell electrode catalyst layer, and a fuel cell.

BACKGROUND ART

The anion exchange resin comprising divalent hydrophobic groups being composed of one aromatic ring, or being composed of a plurality of aromatic rings which are connected to each other via a divalent hydrocarbon group, a divalent silicon-containing group, a divalent nitrogen-containing group, a divalent phosphorus-containing group, a divalent oxygen-containing group, a divalent sulfur-containing group, or carbon-carbon bond; divalent hydrophilic groups being composed of one aromatic ring, or being composed of a plurality of aromatic rings which are connected to each other via a divalent hydrocarbon group, a divalent silicon-containing group, a divalent nitrogen-containing group, a divalent phosphorus-containing group, a divalent oxygen-containing group, a divalent sulfur-containing group, or carbon-carbon bond, the aromatic ring or at least one of the aromatic rings having an anion exchange group; and a divalent fluorine-containing group having a predetermined structure; wherein the divalent hydrophobic groups are connected to each other via ether bond, thioether bond, or carbon-carbon bond to form a hydrophobic unit; wherein the divalent hydrophilic groups are connected to each other via ether bond, thioether bond, or carbon-carbon bond to form a hydrophilic unit; wherein the hydrophobic unit and the hydrophilic unit are connected via ether bond, thioether bond, or carbon-carbon bond; and wherein the divalent fluorine-containing group are connected via ether bond, thioether bond, a carbon-silicon bond, or carbon-carbon bond in the main chain of the hydrophobic unit and/or the hydrophilic unit is known (Patent Document 1).

PATENT DOCUMENT

Patent Document 1: JP 2016-44224 A

SUMMARY OF THE INVENTION

Problem to be Solved by the Invention

However, there is a problem that the anion exchange resin described in Patent Document 1 has insufficient electrical properties (ion conductivity).

Accordingly, an object of the present invention is to provide an anion exchange resin being capable of producing an electrolyte membrane, a binder for forming an electrode catalyst layer and a fuel cell electrode catalyst layer, which have improved electrical properties (ion conductivity); an electrolyte membrane and a binder for forming an electrode catalyst layer produced from the anion exchange resin; a fuel cell electrode catalyst layer produced by the binder for forming the electrode catalyst layer; and a fuel cell having the electrolyte membrane or the electrode catalyst layer.

Means of Solving the Problem

In order to solve the problem, an anion exchange resin of the present invention comprises:

a divalent hydrophobic group being composed of three or more aromatic rings which are connected to each other via carbon-carbon bond; and a divalent hydrophilic group being composed of one aromatic ring, or being composed of a plurality of aromatic rings which are connected to each other via a linking group and/or carbon-carbon bond, wherein the linking group is a divalent hydrocarbon group, a divalent silicon-containing group, a divalent nitrogen-containing group, a divalent phosphorus-containing group, a divalent oxygen-containing group, or a divalent sulfur-containing group, and at least one of the linking group or the aromatic ring comprises an anion exchange group;

wherein the anion exchange resin comprises a hydrophobic unit being composed of the hydrophobic group alone, or being composed of a plurality of hydrophobic groups repeated via ether bond, thioether bond, or carbon-carbon bond;

wherein the anion exchange resin comprises a hydrophilic unit being composed of the hydrophilic group alone, or being composed of a plurality of hydrophilic groups repeated via ether bond, thioether bond, or carbon-carbon bond; and wherein the hydrophobic unit and the hydrophilic unit are connected via ether bond, thioether bond, or carbon-carbon bond.

In the anion exchange resin of the present invention, the hydrophilic group comprises a linear oligophenylene group as shown in the following formula (2).

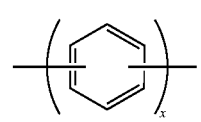

(2)

(In the formula, x represents an integer of 3 to 8.)

In the anion exchange resin of the present invention, the hydrophilic group is suitably composed of a plurality of aromatic rings which are connected to each other via a linking group and/or carbon-carbon bond, wherein the linking group is a divalent hydrocarbon group, a divalent silicon-containing group, a divalent nitrogen-containing group, a divalent phosphorus-containing group, a divalent oxygen-containing group, or a divalent sulfur-containing group, and at least one of the linking group or the aromatic ring is connected to an anion exchange group via a divalent saturated hydrocarbon group having a carbon number of 2 or more; and the hydrophilic group more suitably comprises a fluorene residue as shown in the following formula (3a).

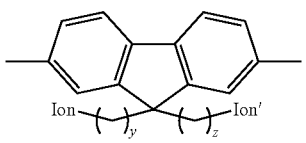

(3a)

(In the formula, Ion and Ion' are the same or different and represent an anion exchange group; and y and z are the same or different and represent an integer of 2 to 20.)

In order to solve the problem, an electrolyte membrane of the present invention comprises an anion exchange resin as described above.

In order to solve the problem, a binder for forming an electrode catalyst layer of the present invention comprises an anion exchange resin as described above.

In order to solve the problem, a fuel cell electrode catalyst layer of the present invention comprises a binder for forming an electrode catalyst layer as described above.

In order to solve the problem, a fuel cell of the present invention comprises:

an electrolyte membrane comprising an anion exchange resin as described above;

a fuel side electrode to which a hydrogen-containing fuel is supplied and an oxygen side electrode to which oxygen or air are supplied, the fuel side electrode and the oxygen side electrode being oppositely disposed by interposing the electrolyte membrane.

In the fuel cell of the present invention, the hydrogen-containing fuel is suitably hydrogen, an alcohol, or a hydrazine.

In order to solve the problem, the fuel cell of the present invention comprises:

an electrolyte membrane;

a fuel side electrode to which a hydrogen-containing fuel is supplied and an oxygen side electrode to which oxygen or air are supplied, the fuel side electrode and the oxygen side electrode being oppositely disposed by interposing the electrolyte membrane;

wherein the fuel side electrode and/or the oxygen side electrode comprises a fuel cell electrode catalyst layer as described above.

In the fuel cell of the present invention, the hydrogen-containing fuel is suitably hydrogen, an alcohol, or a hydrazine.

Effect of the Invention

The present invention can provide an anion exchange resin being capable of producing an electrolyte membrane, a binder for forming an electrode catalyst layer and a fuel cell electrode catalyst layer, which have improved electrical properties (ion conductivity); an electrolyte membrane and a binder for forming an electrode catalyst layer produced from the anion exchange resin; a fuel cell electrode catalyst layer produced by the binder for forming the electrode catalyst layer; and a fuel cell having the electrolyte membrane or the electrode catalyst layer.

MODE FOR CARRYING OUT THE INVENTION

Figure 1:
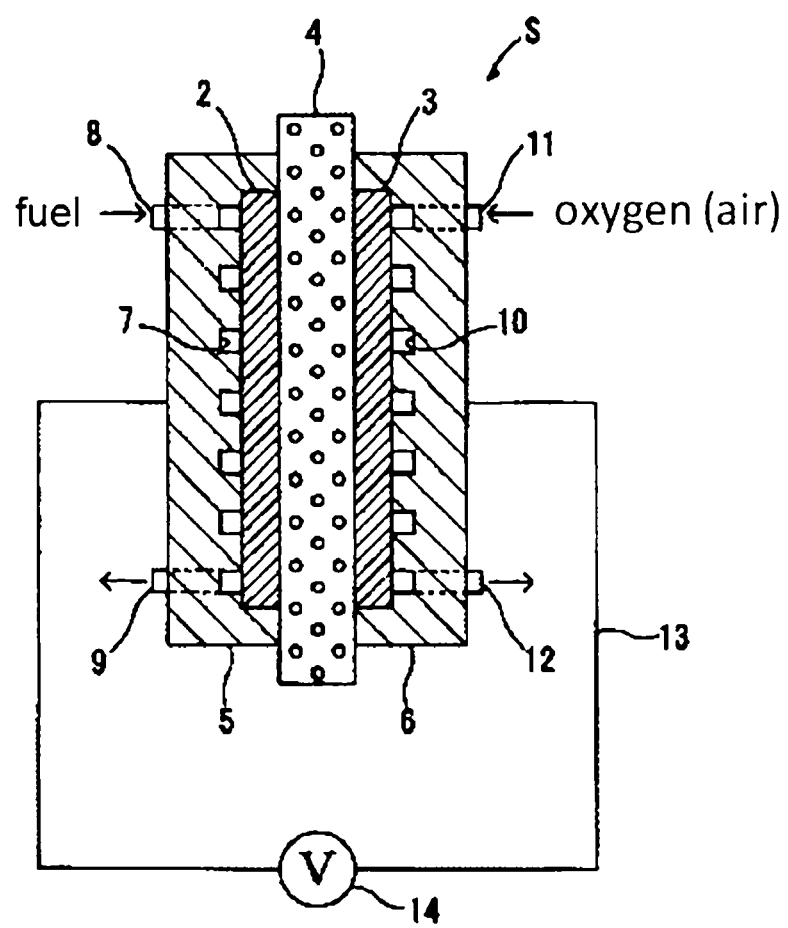
FIG. 1 is a schematic diagram showing an embodiment of the fuel cell of the present invention.

The anion exchange resin of the present invention is composed of a divalent hydrophobic group and a divalent hydrophilic group.

In the anion exchange resin of the present invention, the divalent hydrophobic group is composed of three or more aromatic rings which are connected to each other via carbon-carbon bond. If the divalent hydrophobic group being composed of three or more aromatic rings which are connected to each other via carbon-carbon bond is introduced to the anion exchange resin, the anion exchange resin has improved electrical properties (ion conductivity). In particular, the content of water per one ion group is prevented from increasing even if the IEC (Ion Exchange Capacity) is increased. Therefore, it facilitates to accomplish higher conductivity.

Examples of the aromatic ring include mono- or poly-aromatic hydrocarbons having carbon atoms of 6 to 14 such as benzene ring, naphthalene ring, indene ring, azulene ring, fluorene ring, anthracene ring, and phenanthrene ring; and heterocyclic compounds such as azole, oxole, thiophene, oxazole, thiazole, and pyridine.

Preferred examples of the aromatic ring include mono-aromatic hydrocarbons having carbon atoms of 6 to 14. More preferred examples of the aromatic ring include benzene ring.

The aromatic ring may be substituted with a substituent group such as a halogen atom, an alkyl group, an aryl group, or a pseudohalide, as needed. Examples of the halogen atom include fluorine atom, chlorine atom, bromine atom and iodine atom. Examples of the pseudohalide include a trifluoromethyl group, —CN, —NC, —OCN, —NCO, —ONC, —SCN, —NCS, —SeCN, —NCSe, —TeCN, —NCTe, and —N$_3$. Examples of the alkyl group include alkyl groups having carbon atoms of 1 to 20 such as methyl group, ethyl group, propyl group, i-propyl group, butyl group, i-butyl group, sec-butyl group, t-butyl group, pentyl group, hexyl group, heptyl group, and octyl group; and cycloalkyl groups having carbon atoms of 1 to 20 such as cyclopropyl group, cyclobutyl group, cyclopentyl group, cyclohexyl group, cycloheptyl group, and cyclooctyl group. Examples of the aryl group include phenyl group, biphenyl group, naphtyl group, and fluorenyl group.

When the aromatic ring is substituted with a substituent group such as a halogen atom, an alkyl group, an aryl group, or a pseudohalide, the number and the position of the substituent group such as the halogen atom, the alkyl group, the aryl group, or the pseudohalide is suitably selected depending on the purpose and application.

More specific examples of the aromatic ring substituted with a halogen atom include benzene rings substituted with one to four halogen atoms (for example, benzene rings substituted with one to four fluorine atoms, benzene rings substituted with one to four chlorine atoms, benzene rings substituted with one to four bromine atoms, and benzene rings substituted with one to four iodine atoms, in which one to four halogen atoms may be all the same or different).

Preferred examples of the hydrophobic group include linear oligophenylene groups as shown in the following formula (2).

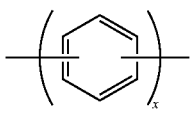

(In the formula, x represents an integer of 3 to 8.)

In the above formula (2), x represents an integer of 3 to 8, is preferably an integer of 4 to 6, and is more preferably represents 5.

Preferred examples of the hydrophobic group include linear oligophenylene groups as shown in the following formula (2') or the following formula (2").

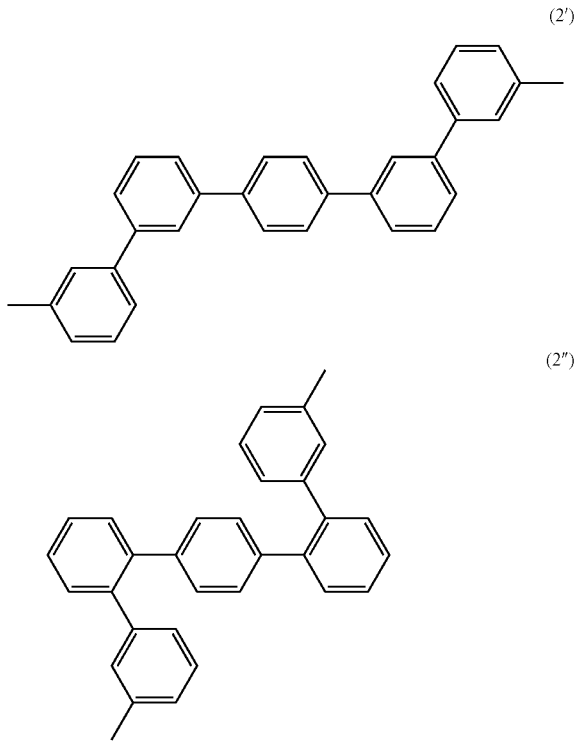

In the anion exchange resin of the present invention, the divalent hydrophilic group is composed of one aromatic ring, or being composed of a plurality of aromatic rings which are connected to each other via a linking group and/or carbon-carbon bond, in which the linking group is a divalent hydrocarbon group, a divalent silicon-containing group, a divalent nitrogen-containing group, a divalent phosphorus-containing group, a divalent oxygen-containing group, or a divalent sulfur-containing group, and at least one of the linking group or the aromatic ring has an anion exchange group.

Preferred examples of the aromatic ring include aromatic rings as described above. More preferred examples of the aromatic ring include benzene ring.

Examples of the divalent hydrocarbon group include divalent hydrocarbon groups as described above.

The anion exchange group is introduced in the main chain or the side chain of the hydrophilic group. Specifically, the anion exchange group is not particularly limited, and any known anion exchange groups including quaternary ammonium groups, tertiary amine groups, secondary amino groups, primary amino groups, phosphine, phosphazene, tertiary sulfonium groups, quaternary boronium groups, quaternary phosphonium groups, and guanidinium group can be selected as the anion exchange group. From the viewpoint of the anion conductivity, preferred examples of the anion exchange group include quaternary ammonium salt.

Preferred examples of the anion exchange group include $-N.(CH_3)_3$. Other examples of the anion exchange group include groups having the following structures. In the following structural formulae, * represents a moiety bonding to the aromatic ring having a substituent group. The anion exchange group may be directly connected to the aromatic ring, or may be connected to the aromatic ring via a divalent hydrocarbon group. Hereinafter, the anion exchange group and the divalent hydrocarbon group which is connected to the aromatic ring may be collectively referred as a "substituent group having an anion exchange group".

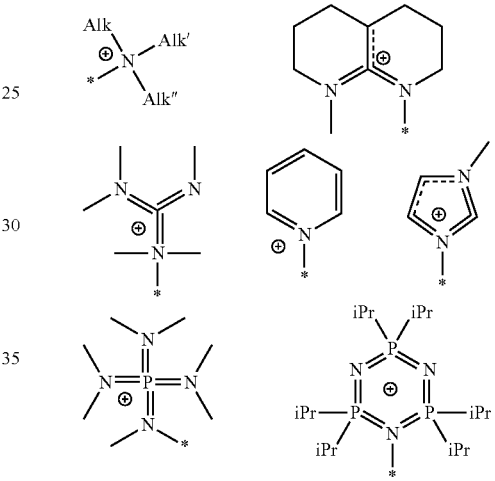

(In the figures, Alk, Alk', and Alk" represent the alkyl group as described above, and iPr represents an isopropyl group.)

Examples of the aromatic ring include aromatic rings as described above. Preferred examples of the aromatic ring include benzene ring.

When the hydrophilic group has a plurality of aromatic rings, at least one of the aromatic rings is substituted with a substituent group having an anion exchange group. A plurality of aromatic rings may be substituted with a substituent group having an anion exchange group, and all aromatic rings may be substituted with a substituent group having an anion exchange group. When two aromatic rings are connected to the divalent hydrocarbon group, at least one of the aromatic rings is substituted with a substituent group having an anion exchange group. For example, one of the aromatic rings in the side chain may be substituted, and both of the aromatic rings may be substituted. One aromatic ring may be substituted with a plurality of substituent groups having an anion exchange group Preferred examples of the hydrophilic group include bisphenol A residues substituted with a substituent group having an anion exchange group, as shown in the following formula (3); and o-, m- or p-phenylene groups substituted with the substituent group having an anion exchange group, as shown in the following formula (3').

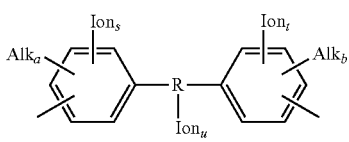

(3)

(In the formula, R represents a hydrocarbon group, a silicon-containing group, a nitrogen-containing group, a phosphorus-containing group, an oxygen-containing group, a sulfur-containing group, or an aromatic group, each of which may be substituted with a substituent group having an anion exchange group as described above, or a direct bond; each Alk is the same or different and represents an alkyl group or an aryl group; each Ion is the same or different and represents a substituent group having an anion exchange group; a and b are the same or different and represent an integer of 0 to 4; s, t, and u are the same or different and represent an integer of 0 to 4, and at least one of s, t, and u represents a number of 1 or more.)

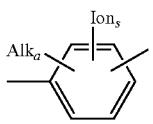

(3')

(In the formula, Alk represents an alkyl group or an aryl group; Ion represents a substituent group having an anion exchange group; a represents an integer of 0 to 4; and s represents an integer of 1 to 4.)

In the above formula (3), each Ion is the same or different and represents a substituent group having an anion exchange group as described above. Preferably, each Ion represents a quaternary ammonium group as described above.

In the above formula (3), s, t, and u are the same or different and represent an integer of 0 to 4, and at least one of s, t, and u represents a number of 1 or more.

In the above formula (3), when s, t, and u are within a range of 1 to 3, the substituted position of the substituent group having an anion exchange group is suitably selected depending on the purpose and application.

In the above formula (3'), Ion represents a substituent group having an anion exchange group as described above. Preferably, Ion represents a quaternary ammonium group as described above.

In the formula (3'), s represents an integer of 1 to 4. The substituted position of the substituent group having an anion exchange group is suitably selected depending on the purpose and application.

Particularly preferred examples of the hydrophilic group include bisphenolfluorene residues as shown in the following formula (6); p-phenylene group as shown in the following formula (6'); and m-phenylene group as shown in the following formula (6").

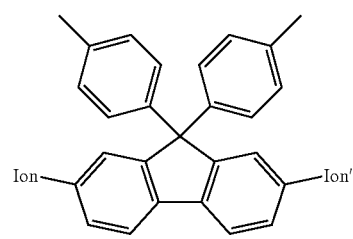

(6)

(In the formula, at least one of Ion and Ion' represents —CH2N+(CH3)3, and the other represents —CH2N+(CH3)3 or a hydrogen atom.)

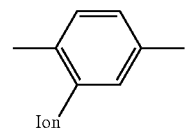

(6')

(In the formula, Ion represents —CH2N+(CH3)3.)

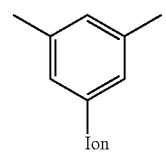

(6")

(In the formula, Ion represents —CH2N+(CH3)3.)

In the anion exchange resin of the present invention, the divalent hydrophilic group is preferably composed of a plurality of aromatic rings which are connected to each other via a linking group and/or carbon-carbon bond, in which the linking group is a divalent hydrocarbon group, a divalent silicon-containing group, a divalent nitrogen-containing group, a divalent phosphorus-containing group, a divalent oxygen-containing group, or a divalent sulfur-containing group, and at least one of the linking group or the aromatic ring is connected to an anion exchange group via a divalent saturated hydrocarbon group having a carbon number of 2 or more.

In this case, the anion exchange group is connected to at least one of the linking group or the aromatic ring. The anion exchange group may be connected to a plurality of linking groups or aromatic rings. The anion exchange group may be connected to all linking groups or aromatic rings. A plurality of anion exchange groups may be connected to one linking group or aromatic ring.

The carbon number of the divalent saturated hydrocarbon group for connecting the anion exchange group to the linking group or the aromatic ring of the divalent hydrophilic residue is 2 or more in which the divalent hydrophilic residue is composed of a plurality of aromatic rings which are connected to each other via the linking group and/or carbon-carbon bond, in which the linking group is a divalent hydrocarbon group, a divalent silicon-containing group, a divalent nitrogen-containing group, a divalent phosphorus-containing group, a divalent oxygen-containing group, or a divalent sulfur-containing group. The carbon number of the divalent saturated hydrocarbon group is preferably an integer of 2 to 20, more preferably an integer of 3 to 10, and further preferably an integer of 4 to 8.

Preferred examples of the divalent saturated hydrocarbon group include linear saturated hydrocarbon groups such as ethylene (—(CH$_2$)$_2$—), trimethylene (—(CH$_2$)$_3$—), tetramethylene (—(CH$_2$)$_4$—), pentamethylene (—(CH$_2$)$_5$—), hexamethylene (—(CH$_2$)$_6$—), heptamethylene (—(CH$_2$)$_7$—), and octamethylene (—(CH$_2$)$_8$—).

Preferred examples of the hydrophilic group include fluorene residues as shown in the following formula (3a).

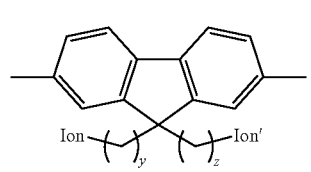

(3a)

(In the formula, Ion and Ion' are the same or different and represent an anion exchange group; and y and z are the same or different and represent an integer of 2 to 20.)

In the above formula (3a), Ion and Ion' are the same or different and represent an anion exchange group. Preferably, Ion and Ion' are the same or different and represent a quaternary ammonium group as described above, and are more preferably —N.(CH$_3$)$_3$.

In the above formula (3a), y and z are the same or different and represent an integer of 2 to 20, are preferably an integer of 3 to 10, and are more preferably an integer of 4 to 8.

Particularly preferred examples of the hydrophilic group include fluorene residues as shown in the following formula (3a').

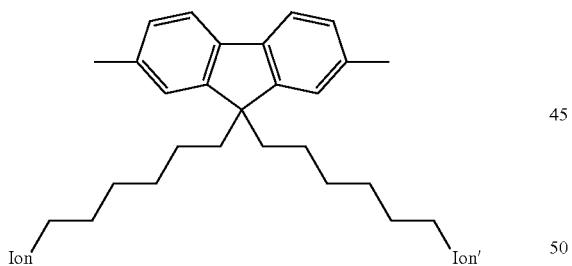

(3a')

Other examples of the hydrophilic group include groups having the following structures.

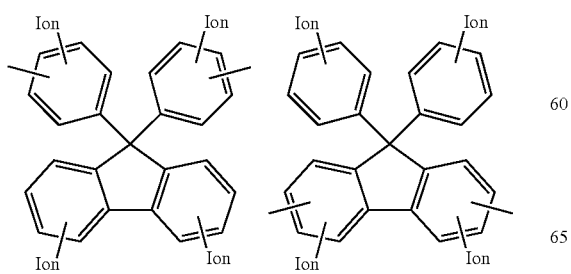

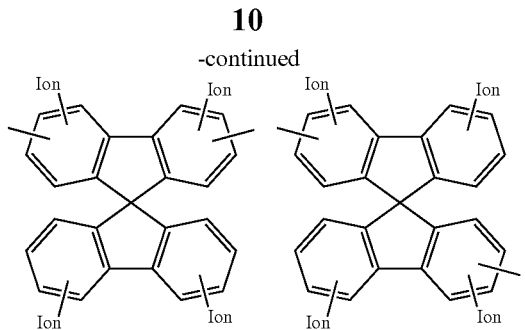

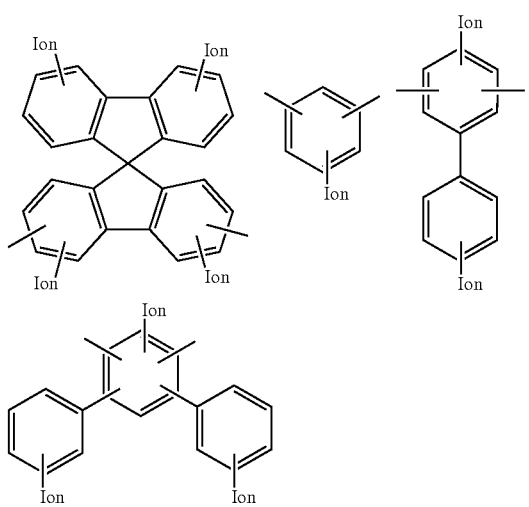

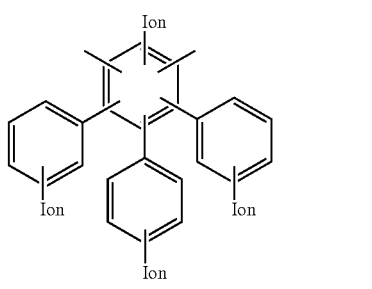

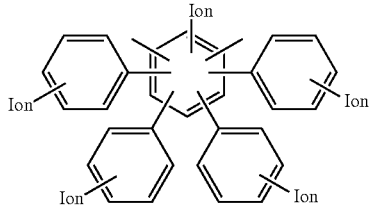

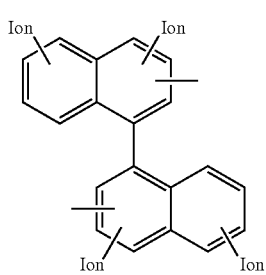

-continued

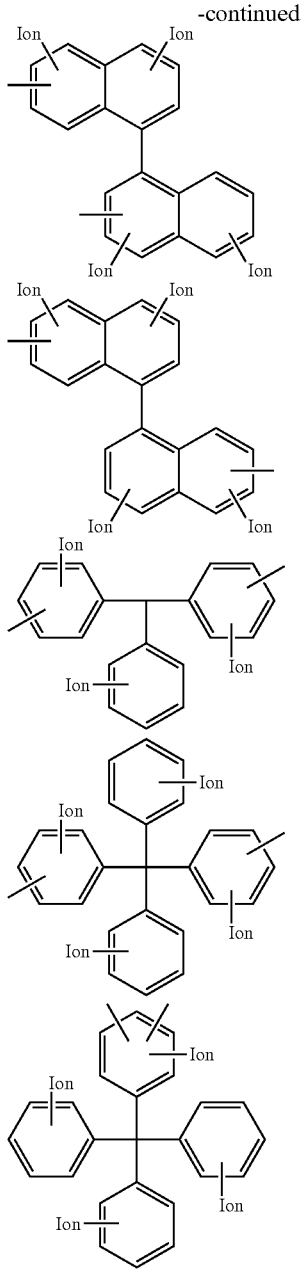

(In the formulae, each Ion represents a substituent group having an anion exchange group or hydrogen atom, and at least one of Ions is a substituent group having an anion exchange group. A plurality of Ion may be connected to one benzene ring structure.)

In the anion exchange resin of the present invention, the hydrophobic group may have a hydrophobic unit and a hydrophilic unit, in which the hydrophobic unit is composed of a plurality of hydrophobic groups repeated via ether bond, thioether bond, or carbon-carbon bond, and in which the hydrophilic unit is composed of a plurality of hydrophilic groups repeated via ether bond, thioether bond, or carbon-carbon bond. Preferably, the hydrophobic unit is composed of a hydrophobic group alone, or is composed of a plurality of hydrophobic groups repeated via carbon-carbon bond. Preferably, the hydrophilic unit is composed of a hydrophilic group alone, or is composed of a plurality of hydrophilic groups repeated via carbon-carbon bond.

It is noted that the unit corresponds to a block commonly used in the block copolymer.

Preferred examples of the hydrophobic unit include units formed by connecting linear oligophenylene groups as shown in the above formula (2) to each other via carbon-carbon bond. The linear oligophenylene group may be a unit formed by connecting a plurality of types of groups in random form, in ordered form including alternating, or in block form.

For example, the hydrophobic unit is shown in the following formula (7).

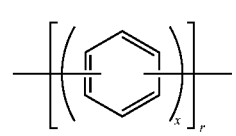

(7)

(In the formula, x has the same meaning as x in the above formula (2); and r represents a number of 1 to 200.)

In the above formula (7), r represents a number of 1 to 200, for example. Preferably, r represents a number of 1 to 50.

For example, the hydrophobic unit is shown in the following formula (7') or the following formula (7").

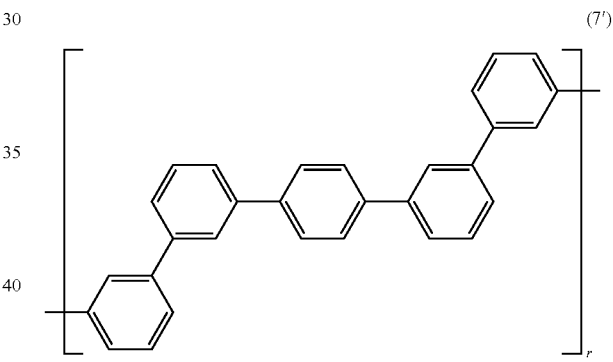

(7')

(In the formula, r represents a number of 1 to 200 (preferably a number of 1 to 50).)

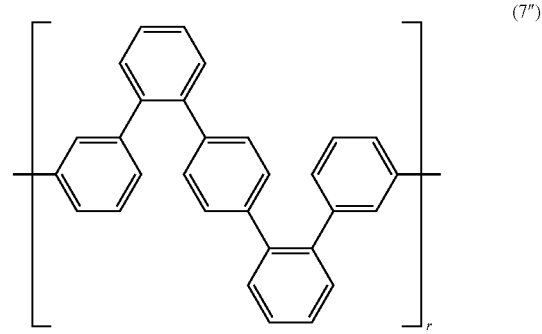

(7")

(In the formula, r represents a number of 1 to 200 (preferably a number of 1 to 50).)

Preferred examples of the hydrophilic unit include units formed by connecting the bisphenol A residues substituted with a substituent group having an anion exchange group as shown in the following formula (3) (hydrophilic group), and/or o-, m- or p-phenylene groups substituted with a substituent group having an anion exchange group as shown in the following formula (3') (hydrophilic group) to each other via carbon-carbon bond. The unit may be a unit formed by connecting a plurality of types of hydrophilic groups to each other via carbon-carbon bond.

For example, the hydrophilic unit is shown in the following formula (9) or the following formula (9').

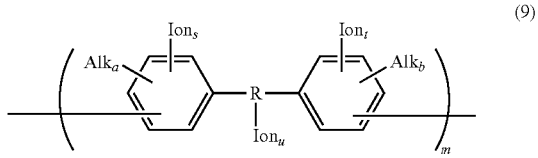

(9)

(In the formula, R, Alk, Ion, a, b, s, and t have the same meaning as R, Alk, Ion, a, b, s, and t in the above formula (3); and m represents an integer of 1 to 200.)

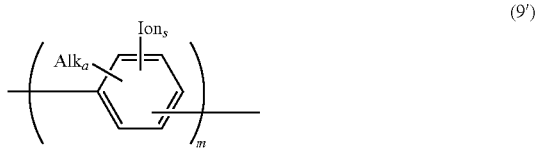

(9')

(In the formula, Alk, Ion, a, and s have the same meaning as Alk, Ion, a, and s in the above formula (3'); and m represents a number of 1 to 200.)

Particularly preferred examples of the hydrophilic unit include units formed by connecting bisphenolfluorene residues as shown in the above formula (6) to each other via carbon-carbon bond; units formed by connecting p-phenylenes as shown in the above formula (6') to each other via carbon-carbon bond; units formed by connecting m-phenylene as shown in the above formula (6") to each other via carbon-carbon bond; and unit formed by connecting p-phenylene as shown in the above formula (6') and m-phenylene as shown in the above formula (6") to each other via carbon-carbon bond.

For example, the hydrophilic unit is shown in the following formula (10), the following formula (10'), the following formula (10"), or the following formula (10''').

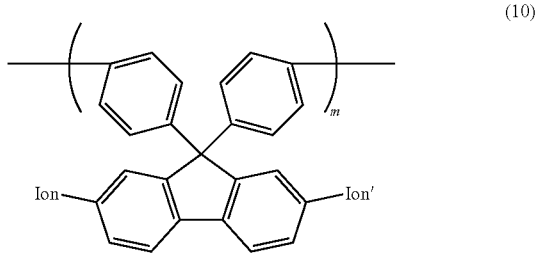

(10)

(In the formula, Ion and Ion' have the same meaning as Ion and Ion' in the above formula (6); and m has the same meaning as m in the above formula (9).)

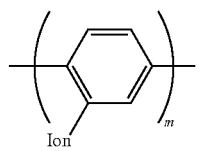

(10')

(In the formula, Ion has the same meaning as Ion in the above formula (6'); and m has the same meaning as m in the above formula (9').)

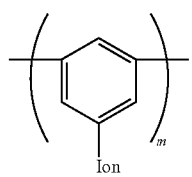

(10")

(In the formula, Ion has the same meaning as Ion in the above formula (6"); and m has the same meaning as m in the above formula (9').)

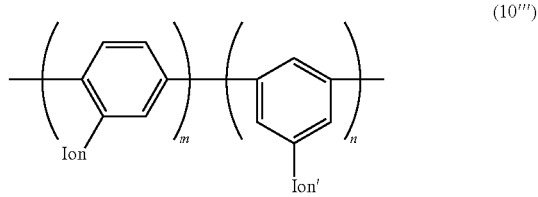

(10''')

(In the formula, Ion and Ion' have the same meaning as Ion and Ion' in the above formula (6') or the above formula (6"); and m and n have the same meaning as m in the above formula (9').)

Particularly preferred examples of the hydrophilic unit include units formed by connecting fluorene residues as shown in the above formula (3a) (the hydrophilic group) to each other via ether bond, thioether bond, or carbon-carbon bond (preferably carbon-carbon bond). The fluorene residue may be a unit formed by connecting a plurality of types of hydrophilic groups in random form, in ordered form including alternating, or in block form.

For example, the hydrophilic unit is shown in the following formula (9a).

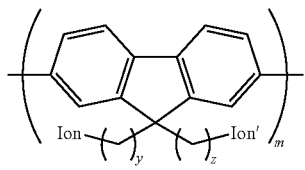
(9a)

(In the formula, Ion, Ion', y, and z are the same or different and have the same meaning as Ion, Ion', y, and z in the above formula (3a); and m represents a number of 1 to 200 (preferably a number of 1 to 50).)

Particularly preferred examples of the hydrophilic unit include units formed by connecting fluorene residues as shown in the above formula (3a') to each other via carbon-carbon bond.

For example, the hydrophilic unit is shown in the following formula (9a').

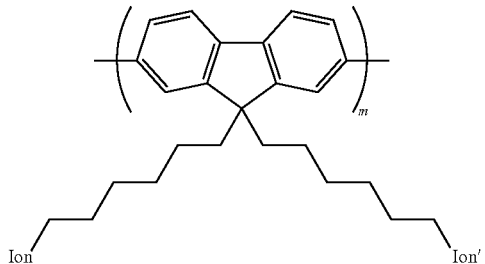
(9a')

(In the formula, Ion and Ion' are the same or different and have the same meaning as Ion and Ion' in the above formula (3a); and m represents a number of 1 to 200 (preferably a number of 1 to 50).)

In the anion exchange resin of the present invention, a hydrophobic unit as described above and a hydrophilic unit as described above are connected via ether bond, thioether bond, or carbon-carbon bond. Preferably, a hydrophobic unit as described above and a hydrophilic unit as described above are connected via carbon-carbon bond.

Preferred examples of the anion exchange resin include anion exchange resins formed by connecting a hydrophobic unit as shown in the above formula (7) and a hydrophilic unit as shown in the above formula (9) via carbon-carbon bond, as shown in the following formula (13); an anion exchange resin formed by connecting the hydrophobic unit as shown in the above formula (7) and the hydrophilic unit as shown in the above formula (9') via carbon-carbon bond, as shown in the following formula (13'); and an anion exchange resin formed by connecting the hydrophobic unit as shown in the above formula (7) and the hydrophilic unit as shown in the above formula (9a) via carbon-carbon bond, as shown in the following formula (13").

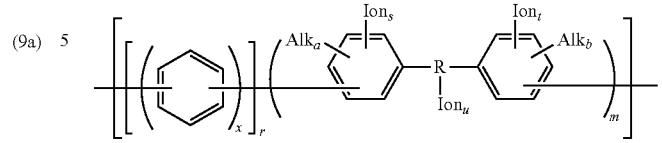
(13)

(In the formula, x has the same meaning as x in the above formula (7); R, Alk, Ion, a, b, s, t, and u have the same meaning as R, Alk, Ion, a, b, s, t, and u in the above formula (9); r and m represent the blending ratio or the repeating number and represent a number of 1 to 100; and o represents the repeating number and represents a number of 1 to 100.)

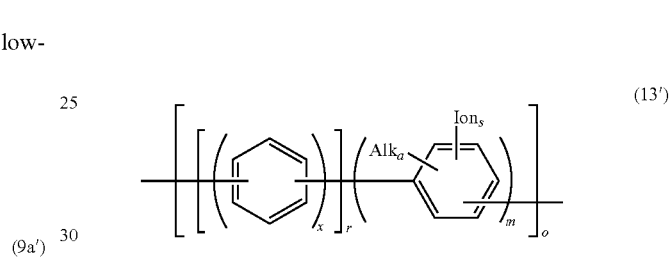
(13')

(In the formula, x has the same meaning as x in the above formula (7); Alk, Ion, a, and s have the same meaning as Alk, A, a, and s in the above formula (9'); r and m represent the blending ratio or the repeating number and represent a number of 1 to 100; and o represents the repeating number and represents a number of 1 to 100.)

(13")

(In the formula, x has the same meaning as x in the above formula (7); Ion, Ion', y, and z have the same meaning as Ion, Ion', y, and z in the above formula (9a); r and m represent the blending ratio or the repeating number and represent a number of 1 to 100; and o represents the repeating number and represents a number of 1 to 100.)

Particularly preferred examples of the anion exchange resin include anion exchange resins formed by connecting a hydrophobic unit as shown in the above formula (7') and a hydrophilic unit as shown in the above formula (9a') via carbon-carbon bond, as shown in the following formula (13a); and anion exchange resins formed by connecting a hydrophobic unit as shown in the above formula (7") and a hydrophilic unit as shown in the above formula (9a') via carbon-carbon bond, as shown in the following formula (13a').

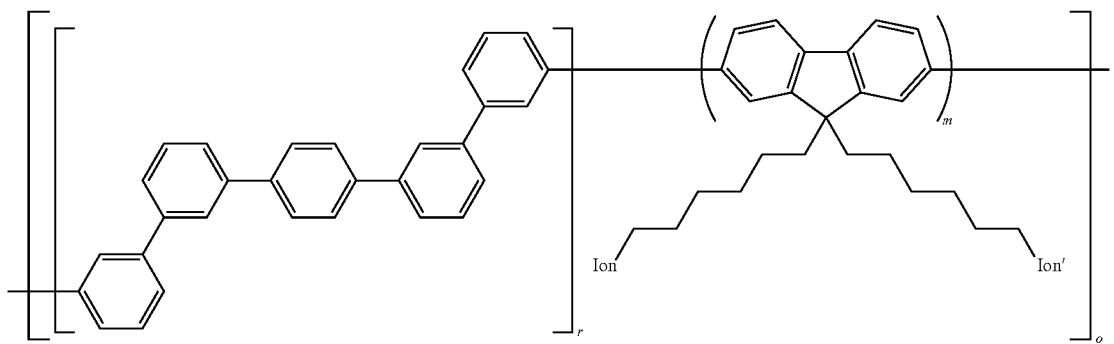

(13a)

(In the formula, Ion and Ion' have the same meaning as Ion and Ion' in the above formula (9a'); r and m represent the blending ratio or the repeating number and represent a number of 1 to 100; and o represents the repeating number and represents a number of 1 to 100.)

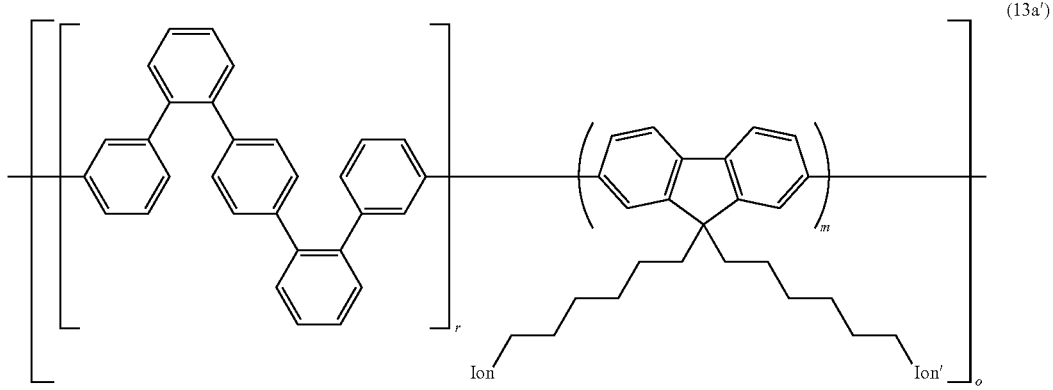

(13a')

(In the formula, Ion and Ion' have the same meaning as Ion and Ion' in the above formula (9a'); r and m represent the blending ratio or the repeating number and represent a number of 1 to 100; and o represents the repeating number and represents a number of 1 to 100.)

As described above, the number average molecular weight of the anion exchange resin is, for example, from 10 to 1000 kDa, and preferably from 30 to 500 kDa.

The method for producing the anion exchange resin is not particularly limited, and any method known in the art can be used. Preferably, the method by polycondensation reaction is used.

When the anion exchange resin is produced by the method, the anion exchange resin can be produced by preparing a monomer for forming a hydrophobic group, by preparing a monomer for forming a hydrophilic group having a precursor functional group for an anion exchange group, by polymerizing the monomer for forming a hydrophobic group and the monomer for forming a hydrophilic group having a precursor functional group for an anion exchange group to form a polymer, and by ionizing the precursor functional group for an anion exchange group in the polymer, for example. Alternatively, the anion exchange resin can be produced by preparing a monomer for forming a hydrophobic group, by preparing a monomer for forming a hydrophilic group, by polymerizing the monomer for forming a hydrophobic group and the monomer for forming a hydrophilic group to form a polymer, and introducing a substituent group having an anion exchange group to the polymer.

For polycondensation reaction, any conventional known method can be used. Preferably, the cross-coupling for forming carbon-carbon bond is used.

Preferred examples of the monomer for forming a hydrophobic group include compounds as shown in the following formula (22), which correspond to the above formula (2).

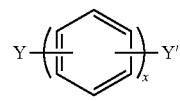

(22)

(In the formula, x has the same meaning as x in the above formula (2); Y and Y' are the same or different and represent a halogen atom, a pseudohalide, boronic acid group, a boronic acid derivative, or hydrogen atom.)

Preferred examples of the monomer for forming the hydrophilic group having a precursor functional group for the anion exchange group include compounds as shown in the following formula (21), which correspond to the above formula (3).

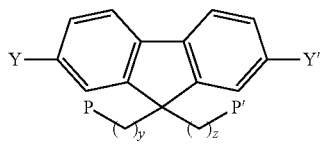
(21)

(In the formula, y and z have the same meaning as y and z in the above formula (3); each P is the same or different and represents a precursor functional group for the anion exchange group; and Y and Y' are the same or different and represent a halogen atom, a pseudohalide, boronic acid group, a boronic acid derivative, or hydrogen atom.)

When a monomer for forming a hydrophobic group and a monomer for forming a hydrophilic group having a precursor functional group for an anion exchange group are polymerized by the cross-coupling, the blended amount of the first monomer and the second monomer is adjusted so that the desired blending ratio of the hydrophobic unit and the hydrophilic unit is obtained in the resulting precursor polymer for the anion exchange resin.

In these method, any known method may be used, including a method by dissolving a monomer for forming a hydrophobic group and a monomer for forming a hydrophilic group having a precursor functional group for an anion exchange group in a solvent such as N,N-dimethylacetamide or dimethyl sulfoxide and by polymerizing these monomers in a presence of bis(cycloocta-1,5-diene)nickel (0) as a catalyst.

The reaction temperature in the cross-coupling reaction is, for example, from −100 to 300° C., and is preferably from −50 to 200° C. The reaction time is, for example, from 1 to 48 hours, and is preferably from 2 to 5 hours.

By this reaction, precursor polymers for the anion exchange resin as shown in the following formula (15), the following formula (16), and the following formula (17) are obtained.

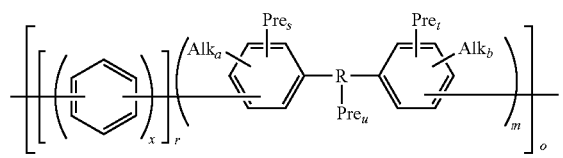
(15)

(In the formula, x has the same meaning as x in the above formula (2); Alk, R, a, b, s, t, and u have the same meaning as Alk, R, a, b, s, t, and u in the above formula (3); each Pre is the same or different and represents a precursor functional group for the anion exchange group; r and m represent the blending ratio or the repeating number and represent a number of 1 to 100; and o represents the repeating number and represents a number of 1 to 100.)

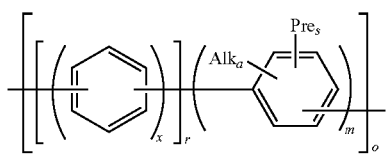
(16)

(In the formula, x has the same meaning as x in the above formula (2); Alk, a, and s have the same meaning as Alk, a, and s in the above formula (3'); each Pre is the same or different and represents a precursor functional group for the anion exchange group; r and m represent the blending ratio or the repeating number and represent a number of 1 to 100; and o represents the repeating number and represents a number of 1 to 100.)

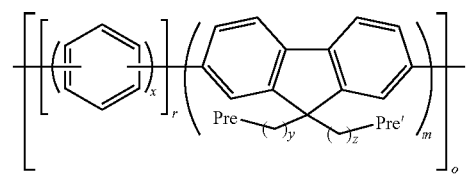
(17)

(In the formula, x has the same meaning as x in the above formula (2); y and z have the same meaning as y and z in the above formula (3a'); Pre and Pre' are the same or different and represent a precursor functional group for the anion exchange group; r and m represent the blending ratio or the repeating number and represent a number of 1 to 100; and o represents the repeating number and represents a number of 1 to 100.)

In this method, the precursor functional group for the anion exchange group is then ionized. The method for the ionization is not particularly limited, and any method known in the art can be used.

For the ionization, any method known in the art can be used, including a method by dissolving a precursor polymer for an anion exchange resin in a solvent such as N,N-dimethylacetamide or dimethyl sulfoxide and by ionizing the precursor polymer with an alkylating agent such as methyl iodide.

The reaction temperature in the ionization reaction is, for example, from 0 to 100° C., and is preferably from 20 to 80° C. The reaction time is, for example, from 24 to 72 hours, and is preferably from 48 to 72 hours.

By this reaction, anion exchange resins as shown in the above formula (13), the above formula (13'), and the above formula (13") are obtained.

The ion exchange capacity of the anion exchange resin is, for example, from 0.1 to 4.0 meq./g, and preferably from 0.6 to 3.0 meq./g.

The ion exchange capacity can be calculated by the following equation (24).

[ion exchange capacity (meq./g)]=the amount of the ion exchange group introduced per hydrophilic unit×the repeating number of the hydrophilic unit×1000/(the molecular weight of the hydrophobic unit×the repeating number of the hydrophobic unit+the molecular weight of the hydrophilic unit×the repeating number of the hydrophilic unit+the molecular weight of the ion exchange group×the repeating number of the hydrophilic unit) (24)

The amount of the ion exchange group introduced is defined as the number of the ion exchange group per unit of the hydrophilic group. The amount of the anion exchange group introduced is the mole number (mol) of the ion exchange group introduced in the main chain or the side chain of the hydrophilic group.

The anion exchange resin comprises a divalent hydrophobic group being composed of three or more aromatic rings which are connected to each other via carbon-carbon bond;

and a divalent hydrophilic group being composed of one aromatic ring, or being composed of a plurality of aromatic rings which are connected to each other via a linking group and/or carbon-carbon bond, wherein the linking group is a divalent hydrocarbon group, a divalent silicon-containing group, a divalent nitrogen-containing group, a divalent phosphorus-containing group, a divalent oxygen-containing group, or a divalent sulfur-containing group, and at least one of the linking group or the aromatic ring comprises an anion exchange group; wherein the anion exchange resin comprises a hydrophobic unit being composed of the hydrophobic group alone, or being composed of a plurality of hydrophobic groups repeated via ether bond, thioether bond, or carbon-carbon bond; wherein the anion exchange resin comprises a hydrophilic unit being composed of the hydrophilic group alone, or being composed of a plurality of hydrophilic groups repeated via ether bond, thioether bond, or carbon-carbon bond; and wherein the hydrophobic unit and the hydrophilic unit are connected via ether bond, thioether bond, or carbon-carbon bond. Therefore, the anion exchange resin has improved electrical properties (ion conductivity) because the divalent hydrophobic group composed of three or more aromatic rings which are connected to each other via carbon-carbon bond is introduced in the anion exchange resin. Additionally, if the hydrophilic group derived from the aromatic ring which is connected to the anion exchange group via the divalent saturated hydrocarbon group having a carbon number of 2 or more is introduced in the anion exchange resin, the resin has improved chemical properties (durability) and mechanical properties (flexibility).

In particular, if the resin has a hydrophilic unit being composed of hydrophilic groups repeated via carbon-carbon bond, the resin does not have ether bond, and therefore the resin has improved durability such as alkali resistance. More specifically, if the hydrophilic unit has ether bond, the decomposition by hydroxide ion (OH—) as described below may occur, and the anion exchange resin may have insufficient alkali resistance.

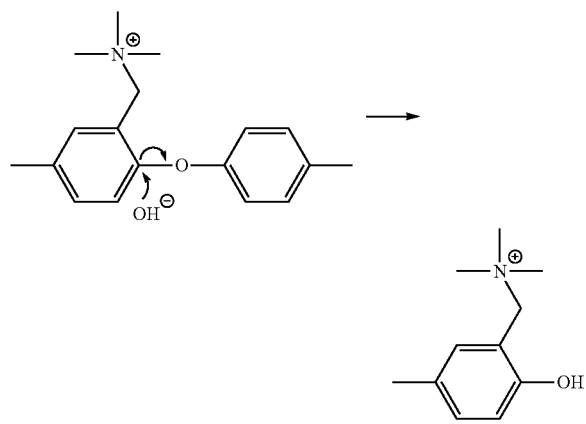

In contrast, since the hydrophilic unit of the anion exchange resin having a hydrophilic unit being composed of the hydrophilic groups repeated via carbon-carbon bond does not have an ether bond, the decomposition by the mechanism as described above does not occur, and therefore the anion exchange resin has an improved durability such as alkali resistance.

The present invention includes an electrolyte layer (an electrolyte membrane) obtained by using the anion exchange resin, and a fuel cell having the electrolyte layer (the electrolyte membrane). That is, the electrolyte membrane of the present invention is preferably an electrolyte membrane for a fuel cell.

FIG. 1 is a schematic diagram showing an embodiment of the fuel cell of the present invention. In FIG. 1, this fuel cell 1 has a cell S for the fuel cell. The cell S for the fuel cell has a fuel side electrode 2, an oxygen side electrode 3, and an electrolyte membrane 4. The fuel side electrode 2 and the oxygen side electrode 3 are oppositely disposed by interposing the electrolyte membrane 4 between them.

As the electrolyte membrane 4, the anion exchange resin as described above can be used (That is, the electrolyte membrane 4 includes the anion exchange resin as described above).

The electrolyte membrane 4 may be reinforced with a reinforcing material known in the art, for example, a porous substrate. Further, the electrolyte membrane 4 may be processed by various procedures including biaxially orientation procedure for controlling the molecular orientation, heat procedure for controlling the crystallinity and the residual stress. A filler known in the art can be added to the electrolyte membrane 4 in order to improve the mechanical strength of the electrolyte membrane 4. The electrolyte membrane 4 and a reinforcing material such as glass unwoven fabric may be pressed to form the complex.

A commonly-used various additive, for example, a compatibilizing agent for improving the compatibility, an antioxidant for preventing the degradation of the resin, and an antistatic agent or a lubricant for improving the handling in forming into the film can be suitably included in the electrolyte membrane 4, as long as the additive does not have an effect on the processability and properties of the electrolyte membrane 4.

The thickness of the electrolyte membrane 4 is not particularly limited, and is suitably selected depending on the purpose and application.

The thickness of the electrolyte membrane 4 is, for example, from 1.2 to 350 µm, and preferably from 5 to 200 µm.

The fuel side electrode 2 is contacted with one surface of the electrolyte membrane 4 so as to be disposed oppositely. For example, the fuel side electrode 2 has the catalyst layer (the fuel cell electrode catalyst layer) in which a catalyst is supported on a porous carrier.

The porous carrier is not particularly limited, and example of the porous carrier includes a water-repellent carrier such as carbon.

The catalyst of the electrode is not particularly limited, and examples of the catalyst include group 8-10 elements in periodic table (according to IUPAC Periodic Table of the Elements (version date 19 Feb. 2010); the same shall apply hereinafter) such as, for example, platinum group elements (Ru, Rh, Pd, Os, Ir, and Pt), and iron group elements (Fe, Co, and Ni); or group 11 elements in periodic table such as, for example, Cu, Ag, and Au, and combination thereof. Preferred examples of the catalyst include Pt (platinum).

For the fuel side electrode 2, for example, the porous carrier and the catalyst are dispersed in an electrolyte solution known in the art to prepare an ink for an electrode. Optionally, the viscosity of the ink for the electrode is adjusted by blending with a suitable amount of an organic solvent such as alcohols, and the ink for the electrode is applied to one surface of the electrolyte membrane 4 by any method known in the art (for example, spraying method or die coater method), and dried at a determined temperature to produce the fuel side electrode 2 as the thin electrode membrane attached to the surface of the electrolyte membrane 4.

The amount of the catalyst for the electrode supported on the fuel side electrode 2 is not particularly limited, and the amount is, for example, from 0.1 to 10.0 mg/cm$^2$, and preferably from 0.5 to 5.0 mg/cm$^2$.

In the fuel side electrode 2, a fuel to be supplied is reacted with a hydroxide ion (OH$^-$) passed through the electrolyte membrane 4 to form an electron (e$^-$) and water (H$_2$O), as described below. For example, when the fuel is hydrogen (H$_2$), only an electron (e$^-$) and water (H$_2$O) are formed. When the fuel is alcohols, an electron (e$^-$), water (H$_2$O), and carbon dioxide (CO$_2$) are formed. When the fuel is hydrazine (NH$_2$NH$_2$), an electron (e$^-$), water (H$_2$O), and nitrogen (N$_2$) are formed.

The oxygen side electrode 3 is contacted with the other surface of the electrolyte membrane 4 so as to be disposed oppositely. For example, the oxygen side electrode 3 has the catalyst layer (the fuel cell electrode catalyst layer) in which a catalyst is supported on a porous carrier.

For the oxygen side electrode 3, for example, the porous carrier and the catalyst are dispersed in an electrolyte solution known in the art to prepare an ink for the electrode. Optionally, the viscosity of the ink for the electrode is adjusted by blending with a suitable amount of an organic solvent such as alcohols, and the ink for the electrode is applied to the other surface of the electrolyte membrane 4 by any method known in the art (for example, spraying method or die coater method), and dried at a determined temperature to produce the oxygen side electrode 3 as the thin electrode membrane attached to the other surface of the electrolyte membrane 4.

Therefore, the electrolyte membrane 4, the fuel side electrode 2, and the oxygen side electrode 3 form a membrane-electrode assembly by attaching the fuel side electrode 2 in the form of thin membrane to the one surface of the electrolyte membrane 4, and attaching the oxygen side electrode 3 in the form of thin membrane to the other surface of the electrolyte membrane 4.

The amount of the catalyst for the electrode supported on the oxygen side electrode 3 is not particularly limited, and the amount is, for example, from 0.1 to 10.0 mg/cm$^2$, and preferably from 0.5 to 5.0 mg/cm$^2$.

In the oxygen side electrode 3, oxygen (O$_2$) to be supplied, water (H$_2$O) passed through the electrolyte membrane 4, and an electron (e$^-$) passed through an external circuit 13 are reacted to form a hydroxide ion (OH$^-$), as described below.

The cell S for the fuel cell further has a fuel supplying member 5 and an oxygen supplying member 6. The fuel supplying member 5 is composed of a gas impermeable conductive member, and one surface of the fuel supplying member 5 is contacted with the fuel side electrode 2 so as to be disposed oppositely. A fuel side path 7 for contacting the fuel with the whole of the fuel side electrode 2 is formed as a winding groove on one surface of the fuel supplying member 5. A supply inlet 8 and an outlet 9 are perforating through the fuel supplying member 5, and the supply inlet 8 and the outlet 9 are continuously formed on the upstream side edge and the downstream side edge of the fuel side path 7, respectively.

The oxygen supplying member 6 is also composed of a gas impermeable conductive member like the fuel supplying member 5, and one surface of the oxygen supplying member 6 is contacted with the oxygen side electrode 3 so as to be disposed oppositely. An oxygen side path 10 for contacting oxygen (air) with the whole of the oxygen side electrode 3 is also formed as a winding groove on one surface of the oxygen supplying member 6. A supply inlet 11 and an outlet 12 are perforating through the oxygen supplying member 6, and the supply inlet 11 and the outlet 12 are continuously formed on the upstream side edge and the downstream side edge of the oxygen side path 10, respectively.

This fuel cell 1 is actually formed as a stack structure in which a plurality of cells S for the fuel cell as described above is layered. Therefore, the fuel supplying member 5 and the oxygen supplying member 6 are actually formed as a separator, and the fuel side path 7 and the oxygen side path 10 are formed on both surfaces of the members.

The fuel cell 1 has a current collector being formed by a conductive member, not shown in the drawings. The electromotive force generated from the fuel cell 1 can be transmitted outwardly through terminals on the current collector.

In FIG. 1, the fuel supplying member 5 and the oxygen supplying member 6 of the cell S for the fuel cell are connected via the external circuit 13, and a voltmeter 14 is disposed in the external circuit 13 to measure the generated voltage.

In the fuel cell 1, the fuel is supplied to the fuel side electrode 2 directly without the reforming process, or after the reforming process.

Examples of the fuel include a hydrogen-containing fuel.

The hydrogen-containing fuel is a fuel having hydrogen atom in the molecule. Examples of the hydrogen-containing fuel include hydrogen gas, alcohols, and hydrazines. Preferred examples of the hydrogen-containing fuel include hydrogen gas and hydrazines.

Specific examples of hydrazines include hydrazine (NH$_2$NH$_2$), hydrated hydrazine (NH$_2$NH$_2$.H$_2$O), hydrazine carbonate ((NH$_2$NH$_2$)$_2$CO$_2$), hydrazine hydrochloride (NH$_2$NH$_2$.HCl), hydrazine sulfate (NH$_2$NH$_2$.H$_2$SO$_4$), monomethyl-hydrazine (CH$_3$NHNH$_2$), dimethylhydrazine ((CH$_3$)$_2$NNH$_2$, CH$_3$NHNHCH$_3$), and carbonhydrazide ((NHNH$_2$)$_2$CO). The listed fuel may be used alone or in combination with two or more kinds.

Among these fuel compounds, carbon-free compounds, i.e., hydrazine, hydrated hydrazine, and hydrazine sulfate do not generate CO and CO2, and do not occur the catalyst poisoning. Therefore, the compounds have an improved durability, and zero-emission can be substantially accomplished.

Although the listed fuel may be used as it is, the listed fuel compound can be used as a solution in water and/or an alcohol (for example, a lower alcohol such as methanol, ethanol, propanol, or isopropanol). In this case, the concentration of the fuel compound in the solution varies depending on the type of the fuel compound but is, for example, from 1 to 90 mass %, and is preferably from 1 to 30 mass %. The listed solvent may be used alone or in combination with two or more kinds.

Additionally, the fuel compound as described above can be used in the form of gas (for example, steam).

By supplying the fuel to the fuel side path 7 of the fuel supplying member 5 while supplying oxygen (air) to the oxygen side path 10 of the oxygen supplying member 6, on the oxygen side electrode 3, an electron (e$^-$) generated in the fuel side electrode 2 and passed through the external circuit 13, water (H$_2$O) generated in the fuel side electrode 2, and oxygen (O$_2$) are reacted to form a hydroxide ion (OH$^-$), as described below. The formed hydroxide ion (OH$^-$) is moved from the oxygen side electrode 3 to the fuel side electrode 2 in the electrolyte membrane 4 being composed of the anion exchange membrane. On the fuel side electrode 2, a hydroxide ion (OH⁻) passed through the electrolyte membrane 4 and the fuel are reacted to form an electron (e⁻) and water ($H_2O$). The formed electron (e⁻) is moved from the fuel supplying member 5 to the oxygen supplying member 6 via the external circuit 13, and supplied to the oxygen side electrode 3. The formed water ($H_2O$) is moved from the fuel side electrode 2 to the oxygen side electrode 3 in the electrolyte membrane 4. The electromotive force was generated by electrochemical reaction on the fuel side electrode 2 and the oxygen side electrode 3 to produce electricity.

Although the operating condition of the fuel cell 1 is not particularly limited, for example, the condition in which the applied pressure on the fuel side electrode 2 is 200 kPa or less, and preferably 100 kPa or less, the applied pressure on the oxygen side electrode 3 is 200 kPa or less, and preferably 100 kPa or less, and the temperature of the cell S for the fuel cell is from 0 to 120° C., and preferably from 20 to 80° C. is selected.

In the fuel cell 1, the electrolyte membrane for a fuel cell having the anion exchange resin having an improved durability as described above is used in the electrolyte membrane 4.

Therefore, the electrolyte membrane for a fuel cell of the present invention obtained by using the anion exchange resin of the present invention, and the fuel cell having the electrolyte membrane for a fuel cell have an improved durability.

The present invention also includes a binder for forming an electrode catalyst layer having an anion exchange resin as described above, an electrode catalyst layer for a fuel cell having the binder for forming an electrode catalyst layer, and the fuel cell having the electrolyte layer for a fuel cell.

Thus, in the fuel cell 1, the anion exchange resin can be included in the binder for forming the electrode catalyst layer during the formation of the fuel side electrode 2 and/or the oxygen side electrode 3.

Specifically, as the method for including the anion exchange resin in the binder for forming an electrode catalyst layer, for example, the binder for forming an electrode catalyst layer is prepared by cutting the anion exchange resin into pieces, and then dissolving the resin in a suitable amount of an organic solvent such as alcohols.

In the binder for forming the electrode catalyst layer, the amount of the anion exchange resin is, for example, from 2 to 10 parts by mass, and preferably from 2 to 5 parts by mass with respect to 100 parts by mass of the binder for forming the electrode catalyst layer.

By using the binder for forming an electrode catalyst layer for the formation of the catalyst layer (the fuel cell electrode catalyst layer) of the fuel side electrode 2 and/or the oxygen side electrode 3, the catalyst layer (the fuel cell electrode catalyst layer) can have the anion exchange resin. Therefore, the fuel cell 1 having the catalyst layer (the fuel cell electrode catalyst layer) including the anion exchange resin can be obtained.

In the fuel cell 1, the binder for forming the electrode catalyst layer including the anion exchange resin having an improve durability as described above is used for the formation of the fuel cell electrode catalyst layer.

Therefore, the binder for forming the electrode catalyst layer of the present invention obtained by using the anion exchange resin of the present invention, and the fuel cell electrode catalyst layer obtained by using the binder for forming the electrode catalyst layer have an improved durability and an improved anion conductivity.

As a result, the fuel cell having the fuel cell electrode catalyst layer has an improved durability and an improved anion conductivity.

Although exemplary embodiments of the present invention have been described hereinabove, the embodiments of the present invention are not limited to these embodiments, but may be suitably modified by those skilled in the art without departing from the scope of the invention.

Exemplary applications of the fuel cell of the present invention include power supplies of drive motors for automobiles, marine vessels, or aircrafts; and power supplies for communication terminals including mobile phones.

EXAMPLE

Although the present invention is described based on the Example and the Comparative Example, the present invention is not limited to the following Example.

Example 1

Synthesis of Anion Exchange Resin QP-QAF (IEC=2.25 meq./g)

<Synthesis of Monomer 1>

To a 1 L three-necked round-shaped flask equipped with a nitrogen inlet and a condenser were added 1,4-phenylenediboronic acid (9.76 g, 58.9 mmol), 1-bromo-3-iodobenzene (50.0 g, 177 mmol), tri(o-tolyl)phosphine (1.34 g, 4.42 mmol), 2 M aqueous potassium carbonate solution (100 mL, 200 mmol), toluene (320 mL), and ethanol (120 mL). To the resulting suspension was added palladium acetate (II) (198 mg, 0.883 mmol), and the reaction was carried out at 80° C. for 25 hours. After adding pure water and toluene to the reaction solution, insolubles were removed by filtration. After the target compound was extracted with toluene from the water phase, and water, ethanol, and toluene were removed from the combined organic phase. The precipitate was washed with methanol, and was then dried under vacuum overnight (60° C.) to obtain a monomer 1 (white solid) as shown in the following formula in a yield of 49%.

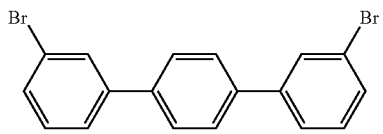

<Synthesis of Monomer 2>

To a 500 mL three-necked round-shaped flask were added the monomer 1 (15.7 g, 40.3 mmol), 3-chlorophenylboronic acid (25.2 g, 161 mmol), sodium carbonate (17.1 g, 161 mmol), N,N-dimethylformamide (120 mL), and pure water (160 mL). To the resulting suspension was added palladium acetate (II) (906 mg, 4.03 mmol), and the reaction was carried out at 60° C. for 24 hours. After adding pure water and toluene to the reaction solution, insolubles were removed by filtration. After the target compound was extracted with toluene from the water phase, and water and toluene were removed from the combined organic phase. After the precipitate was washed with methanol, the precipitate was treated with an activated carbon and re-precipitated, and was then dried under vacuum overnight (60° C.) to obtain a monomer 2 (white solid) as shown in the following formula in a yield of 50%.

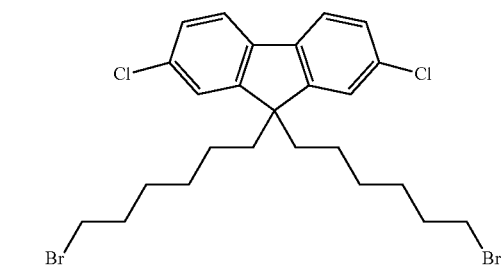

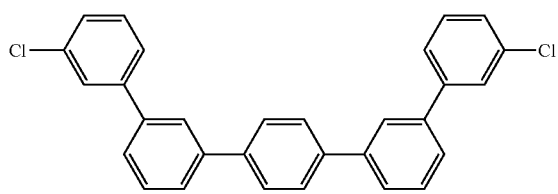 [SMILES: Clc1cccc(-c2cccc(-c3ccc(-c4cccc(-c5cccc(Cl)c5)c4)cc3)c2)c1]

<Synthesis of Monomer 3>

To a 500 mL three-necked round-shaped flask were added fluorene (83.1 g, 0.50 mol), N-chlorosuccinimide (167 g, 1.25 mol), and acetonitrile (166 mL). After the mixture was stirred to form a homogeneous solution, 12 M hydrochloric acid (16.6 mL) was added, and the reaction was carried out at room temperature for 24 hours. The reaction mixture was filtered to collect the precipitate. The precipitate was washed with methanol and with pure water, and was then dried under vacuum overnight (60° C.) to obtain a monomer 3 (white solid) as shown in the following formula in a yield of 65%.

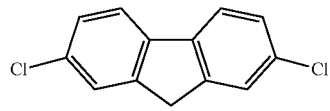 [SMILES: Clc1ccc2c(c1)Cc1cc(Cl)ccc1-2]

<Synthesis of Monomer 4>

To a 300 mL three-necked round-shaped flask were added the monomer 3 (8.23 g, 35.0 mmol) and 1,6-dibromohexane (53 mL). After the mixture was stirred to form a homogeneous solution, a mixed solution of tetrabutylammonium (2.26 g, 7.00 mmol), potassium hydroxide (35.0 g) and pure water (35 mL) were added, and the reaction was carried out at 80° C. for 1 hour. The reaction was quenched by adding pure water to the reaction solution. The target compound was extracted with dichloromethane from the water phase. The combined organic phase was washed with pure water and with sodium chloride solution, and then water, dichloromethane, and 1,6-dibromohexane were distilled off. The crude product was purified by column chromatography on silica gel (eluent: dichlorometane/hexane=1/4), and was then dried under vacuum overnight (60° C.) to obtain a monomer 4 (pale yellow solid) as shown in the following formula in a yield of 75%.

<Synthesis of Monomer 5>

To a 300 mL three-necked round-shaped flask were added the monomer 4 (13.2 g, 23.4 mol) and tetrahydrofuran (117 mL). After the mixture was stirred to form a homogeneous solution, 40 wt % dimethylamine aqueous solution (58.6 mL) was added, and the reaction was carried out at room temperature for 24 hours. The reaction was quenched by adding a saturated solution of sodium hydrogen carbonate in water to the reaction solution. Tetrahydrofuran was removed from the solution and then the target ingredient was extracted by adding hexane. The organic phase was washed with sodium chloride solution, and then water and hexane were distilled off. The resulting product was dried under vacuum overnight (40° C.) to obtain a monomer 5 (pale yellow solid) as shown in the following formula in a yield of 75%.

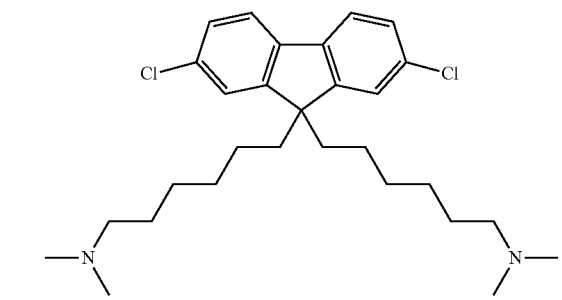

(Polymerization Reaction)

To a 100 mL three-necked round-shaped flask equipped with a nitrogen inlet and a condenser were added the monomer 2 (372 g, 825 µmol), the monomer 5 (404 mg, 825 µmol), 2,2'-bipyridine (600 mg, 3.84 mmol), N,N-dimethylacetamide (10 mL), and toluene (5 mL). After the resulting mixture was stirred at 170° C. for 2 hours, toluene was removed. After the reaction solution was leaved to cool down to 80° C., bis(1,5-cyclooctadiene)nickel(0) (1.00 g, 3.64 mmol) was added, and then the reaction was carried out at 80° C. for 3 hours. The reaction was quenched by adding the reaction mixture dropwise to 12 M hydrochloric acid. The reaction mixture was filtered to collect the precipitate. The precipitate was washed with pure water, with 0.2 M aqueous potassium carbonate solution, with pure water and with methanol, and was then dried under vacuum overnight (60° C.) to obtain a precursor polymer for an anion exchange resin PAF (pale brown solid) in a yield of 99%.

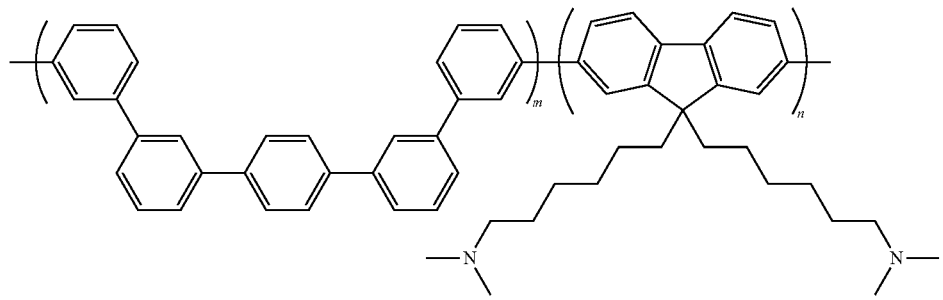

(Quaternizing Reaction)

To a 20 mL three-necked round-shaped flask were added the precursor polymer for the anion exchange resin QP-AF (300 mg) and N,N-dimethylacetamide (3 mL). After the resulting mixture was stirred to form a homogeneous solution, dimethyl sulfate (382 µL, 717 µmol) was added, and the reaction was carried out at room temperature for 48 hours. N,N-dimethylacetamide (3 mL) was added to the reaction solution, and then the solution was added dropwise to pure water. The reaction mixture was filtered to collect the precipitate. The precipitate was washed with pure water, and was then dried under vacuum overnight (60° C.) to obtain an anion exchange resin QP-QAF (orange solid).

(Formation of Membrane and Ion Exchange)

To a 20 mL three-necked round-shaped flask were added the anion exchange resin QP-QAF (300 mg) and N,N-dimethylacetamide (3 mL). After the resulting mixture was stirred to form a homogeneous solution, the solution was filtered. The filtrate was poured into a glass plate wound with silicone rubber, and was kept on a hot plate adjusted so as to be oriented horizontally at 50° C., for drying. The resulting membrane was washed with pure water (2 L), and was then dried under vacuum overnight (60° C.) to obtain a transparent membrane having yellow color. Further, the counter-ion of the anion exchange group (quaternary ammonium group) in the membrane was converted to hydroxide ion by immersing in 1 M aqueous potassium hydroxide solution for 48 hours and by washing it with degassed pure water. By the reaction, an anion exchange resin QP-QAF as shown the following formula (m/n=1.1/1.0, IEC=2.25 meq./g, hydroxide ion type) was obtained.

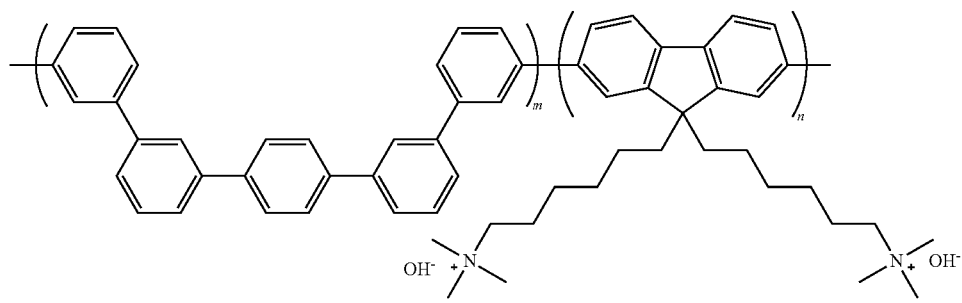

Example 2

Synthesis of Anion Exchange Resin QP-QAF
(IEC=2.00 meq./g)

A membrane of the anion exchange resin QP-QAF (m/n=5.6/4.0, IEC=2.00 meq./g) was obtained by using the similar method as described above with the monomer 2 and the monomer 5 with modifying the charged amounts of various reagents if needed.

Example 3

Synthesis of Anion Exchange Resin QP-QAF
(IEC=1.84 meq./g)

A membrane of the anion exchange resin QP-QAF (m/n=3.6/2.0, IEC=1.84 meq./g) was obtained by using the similar method as described above with the monomer 2 and the monomer 5 with modifying the charged amounts of various reagents if needed.

Example 4

Synthesis of Anion Exchange Resin QP-QAF
(IEC=1.60 meq./g)

The membrane of the anion exchange resin QP-QAF (m/n=2.2/1.0, IEC=1.60 meq./g) was obtained by using the similar method as described above with the monomer 2 and the monomer 5 with modifying the charged amounts of various reagents if needed.

Example 5

Synthesis of Anion Exchange Resin QP-QAF
(IEC=1.22 meq./g)

The membrane of the anion exchange resin QP-QAF (m/n=3.4/1.0, IEC=1.22 meq./g) was obtained by using the similar method as described above with the monomer 2 and the monomer 5 with modifying the charged amounts of various reagents if needed.

Example 6

Synthesis of Anion Exchange Resin QP-QAF
(IEC=0.96 meq./g)

The membrane of the anion exchange resin QP-QAF (m/n=3.9/1.0, IEC=0.96 meq./g) was obtained by using the similar method as described above with the monomer 2 and the monomer 5 with modifying the charged amounts of various reagents if needed.

Example 7

Synthesis of Anion Exchange Resin QP-QAF
(IEC=0.80 meq./g)

The membrane of the anion exchange resin QP-QAF (m/=4.6/1.0, IEC=0.80 meq./g) was obtained by using the similar method as described above with the monomer 2 and the monomer 5 with modifying the charged amounts of various reagents if needed.

Comparative Example 1

Synthesis of Anion Exchange Resin QPAF-1
(IEC=1.26 meq./g)

<Synthesis of Monomer 6>

To a 100 mL three-necked round-shaped flask equipped with a nitrogen inlet and a condenser were added 1,6-diiodoperfluorohexane (5.54 g, 10.0 mmol), 3-chloroiodobenzene (11.9 g, 50 mmol), and N,N-dimethyl sulfoxide (60 mL). After the mixture was stirred to form a homogeneous solution, copper powder (9.53 g, 150 mmol) was added, and the reaction was carried out at 120° C. for 48 hours. The reaction was quenched by adding the reaction solution dropwise to 0.1 M aqueous nitric acid solution. The mixture was filtered to collect the precipitate. The precipitate was washed with methanol, and then the filtrate was collected. After the similar procedure was repeated, a white solid was precipitated by adding pure water to the combined filtrate. The white solid was filtered and collected, was washed with a mixed solution (pure water/methanol=1:1), and was then dried under vacuum overnight (60° C.) to obtain a monomer 6 (white solid) as shown in the following formula in a yield of 84%.

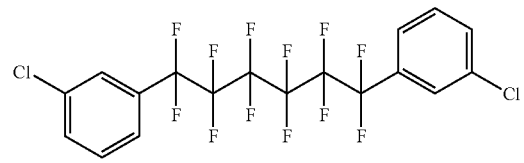 [SMILES: FC(F)(c1cccc(Cl)c1)C(F)(F)C(F)(F)C(F)(F)C(F)(F)C(F)(F)c1cccc(Cl)c1]

(Polymerization Reaction)

To a 100 mL three-necked round-shaped flask equipped with a nitrogen inlet and a condenser were added the monomer 6 (0.26 g, 0.50 mmol), 1,4-dichlorobenzene (0.020 g, 0.14 mmol), 1,3-dichlorobenzene (0.060 g, 0.41 mmol), 2,2'-bipyridine (0.41 g, 2.6 mmol), and N,N-dimethylacetamide (3 mL). After the mixture was stirred to form a homogeneous solution, bis(1,5-cyclooctadiene)nickel(0) (0.72 g, 2.6 mmol) was added, and the reaction was carried out at 80° C. for 3 hours. The reaction was quenched by adding the reaction mixture dropwise to 12 M hydrochloric acid. The reaction mixture was filtered to collect the precipitate. The precipitate was washed with pure water and with methanol, and was then dried under vacuum overnight (60° C.) to obtain a precursor polymer for an anion exchange resin PAF-1 (white solid) as shown in the following formula in a yield of 86%.

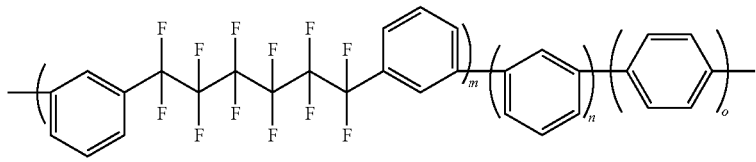

(Chloromethylation Reaction)

To a 100 mL glass reactor were added the precursor polymer for the anion exchange resin (0.20 g) and 1,1,2,2-tetrachloroethane (9 mL). After the mixture was stirred to form a homogeneous solution, in a glove box under argon, chloromethyl methyl ether (5 ml) and 0.5 mol/L solution of zinc chloride in tetrahydrofuran (1 ml) were added, and the reaction was carried out at 80° C. for 5 days. The reaction was quenched by adding the reaction mixture dropwise to methanol. The reaction mixture was filtered to collect the precipitate. The precipitate was washed with methanol, and was then dried under vacuum overnight (60° C.) to obtain a chloromethylated precursor polymer for an anion exchange resin as shown in the following formula.

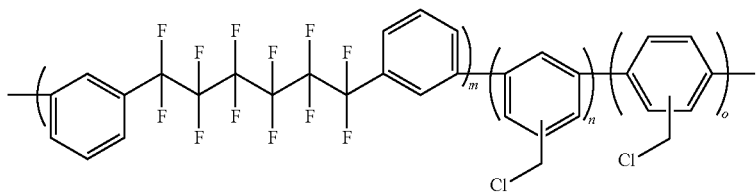

(Quaternizing Reaction)

The chloromethylated precursor polymer for the anion exchange resin (100 mg) was immersed in 45 wt % solution of trimethylamine in water, and was reacted at room temperature for 48 hours. As the reaction was proceeded, the chloromethylated precursor polymer for the anion exchange resin was dissolved to obtain a homogeneous solution. After the solution was added dropwise to 1 M hydrochloric acid, a dialysis tube (cutoff molecular weight of 1 kDa) was used to remove trimethylamine and hydrochloric acid. Water was distilled off, and it was then dried under vacuum overnight (60° C.) to obtain an anion exchange resin QPAF-1 (brown solid) in a yield of 75%.

(Formation of Membrane and Ion Exchange)

To a 20 mL three-necked round-shaped flask were added QPAF-1 (100 mg) and N,N-dimethylacetamide (2 mL). After the mixture was stirred to form a homogeneous solution, the solution was filtered. The filtrate was poured into a glass plate wound with silicone rubber and was kept on a hot plate adjusted so as to be oriented horizontally at 50° C., for drying to obtain a transparent membrane. Further, the counter-ion of the anion exchange group (quaternary ammonium group) in the membrane was converted to hydroxide ion by immersing it in 1 M aqueous potassium hydroxide solution for 48 hours and by washing it with degassed pure water. By the reaction, a membrane of an anion exchange resin QPAF-1 as shown the following formula (m/n/o=1.0/0.41/0.53, IEC=1.26 meq./g, hydroxide ion type) was obtained.

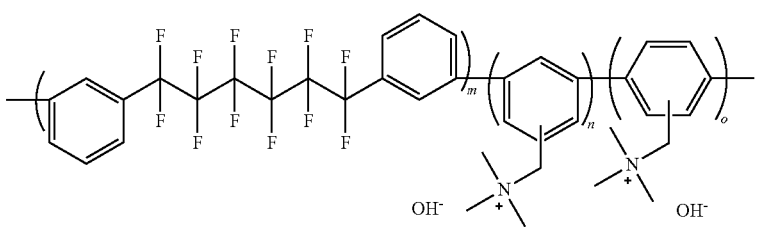

Comparative Example 2

Synthesis of Anion Exchange Resin QPAF-1
(IEC=0.86 meq./g)

The membrane of the anion exchange resin QP-QAF (m/n/o=1.00/0.17/0.40, IEC=0.86 meq./g) was obtained by using the similar method as described above with the monomer 6, 1,4-dichlorobenzene and 1,3-dichlorobenzene with modifying the charged amounts of various reagents if needed.

Comparative Example 3

Synthesis of Anion Exchange Resin QPAF-1
(IEC=1.52 meq./g)

The membrane of the anion exchange resin QP-QAF (m/n/o=1.00/0.71/0.67, IEC=1.52 meq./g) was obtained by using the similar method as described above with the monomer 6, 1,4-dichlorobenzene and 1,3-dichlorobenzene with modifying the charged amounts of various reagents if needed.

Comparative Example 4

Synthesis of Anion Exchange Resin QPAF-1
(IEC=1.74 meq./g)

The membrane of the anion exchange resin QP-QAF (m/n/o=1.00/1.05/0.81, IEC=1.74 meq./g) was obtained by using the similar method as described above with the monomer 6, 1,4-dichlorobenzene and 1,3-dichlorobenzene with modifying the charged amounts of various reagents if needed.

Comparative Example 5

Synthesis of Anion Exchange Resin QPAF-1
(IEC=0.79 meq./g)

The membrane of the anion exchange resin QP-QAF (m/n/o=1.38/0.36/0.47, IEC=0.79 meq./g) was obtained by using the similar method as described above with the monomer 6, 1,4-dichlorobenzene and 1,3-dichlorobenzene with modifying the charged amounts of various reagents if needed.

Comparative Example 6

Synthesis of Anion Exchange Resin QPAF-1
(IEC=1.58 meq./g)

The membrane of the anion exchange resin QP-QAF (m/n/o=0.79/0.42/0.55, IEC=1.58 meq./g) was obtained by using the similar method as described above with the monomer 6, 1,4-dichlorobenzene and 1,3-dichlorobenzene with modifying the charged amounts of various reagents if needed.

Comparative Example 7

Synthesis of Anion Exchange Resin QPAF-1
(IEC=1.61 meq./g)

The membrane of the anion exchange resin QP-QAF (m/n/o=0.65/0.47/0.61, IEC=1.61 meq./g) was obtained by using the similar method as described above with the monomer 6, 1,4-dichlorobenzene and 1,3-dichlorobenzene with modifying the charged amounts of various reagents if needed.

<Measurement of Hydroxide Ion Conductivity>

The hydroxide ion conductivities of the membranes of the anion exchange resins obtained in the Examples and the Comparative Examples were measured. The hydroxide ion conductivity $\sigma$ (S/cm) was calculated by the following equation from the distance between probes L (1 cm), the impedance Z ($\Omega$), and the cross-sectional area of the membrane A (cm$^2$).

$$\sigma = (L/Z) \times 1/A$$

Impedance was measured by four-terminal method using alternating current (300 mV, 10-100000 Hz) in water at 30° C. Solartolon 1255B/1287 was used as an apparatus for the measurement, and a gold wire having a diameter of 1 mm was used as the probe.

<Measurement of Content of Water per One Ion Group>

The contents of water per one ion group were measured for the membranes of the anion exchange resins obtained in the Examples and the Comparative Examples. The content of water was calculated by using the mass of the wet membrane: $W_{wet}$ (g), the mass of the dried membrane: $W_{dry}$ (g), and the ion exchange capacity: IEC (meq./g).

$$\lambda = ((W_{wet} - W_{dry})/18)/(W_{dry} \times \text{IEC}/1000)$$

$W_{wet}$ was calculated as the difference of the weight by immersing the membrane in pure water for 24 hours or more, thereafter by wiping off water drops on the surface of the membrane, by quickly transferring the membrane into the sampling bottle whose mass had been previously measured, and by weighing the sampling bottle sealed with a cap. $W_{dry}$ was calculated as the difference of the weight by drying a wet membrane under vacuum for 12 hours (60° C.), thereafter by quickly transferring the membrane into the sampling bottle whose mass had been previously measured, and by weighing the sampling bottle sealed with a cap. IEC was calculated by $W_{dry}$ and a (mmol) which is the substance amount of the counter-ion in the membrane.

$$\text{IEC} = a/W_{dry}$$

When the chloride ion type membrane was stirred in an aqueous sodium nitrate solution, the substance amount of chloride ion released in the aqueous solution by the ion exchange was measured as "a" with Mohr's method.

Figure 2:
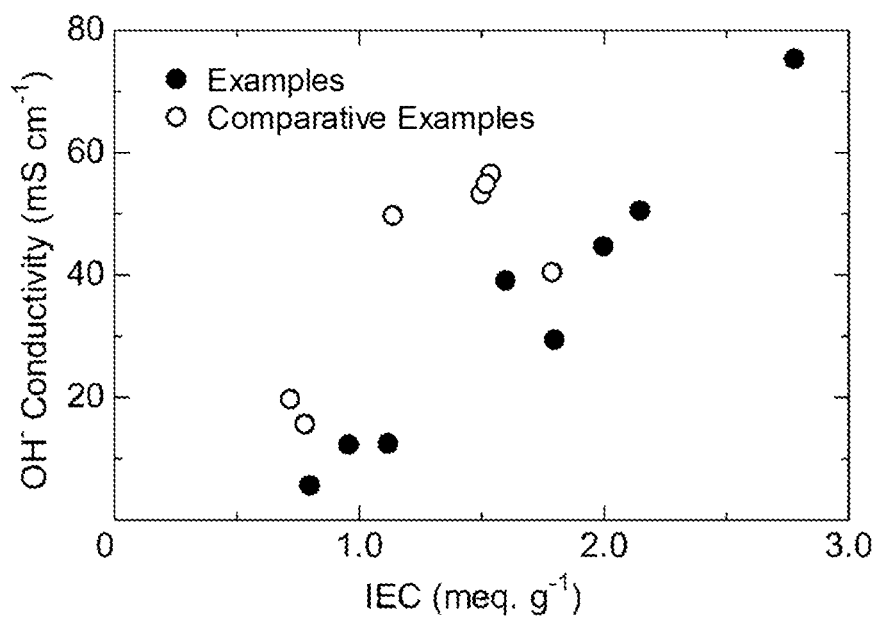
FIG. 2 is a graph showing the results of hydroxide ion conductivity for each sample obtained in the Examples and the Comparative Examples.

The hydroxide ion conductivities of the samples of the Examples are increased and are at most 75 mS/cm (FIG. 2), as the IEC is increased. In contrast, although the hydroxide ion conductivities of the samples of the Comparative Examples are increased as the IEC is increased, but the hydroxide ion conductivities are similar or are decreased in association with IEC when the IEC is more than 1.5.

(Discussion)

Figure 3:
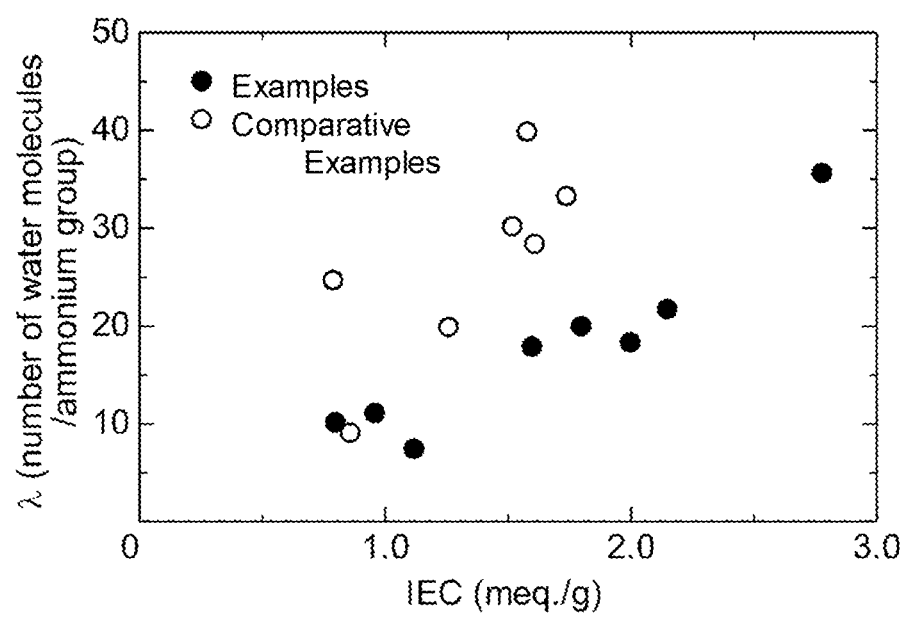
FIG. 3 is a graph showing the results of Tensile test for each sample obtained in the Examples.

For the samples of the Examples, A is slowly increased as the IEC is increased. In contrast, for the samples of the Comparative Examples, A is rapidly increased as the IEC is increased (FIG. 3). It is believed that the hydroxide ion conductivities remain lower in the samples of the Comparative Examples having a high A because the carrier concentration is decreased due to an excess amount of water.

DENOTATION OF REFERENCE NUMERALS

1 fuel cell
2 fuel side electrode 3 oxygen side electrode
4 electrolyte membrane
S cell for fuel cell

What is claimed is:

1. An anion exchange resin, comprising:
a divalent hydrophobic group being composed of three or more aromatic rings which are connected to each other via carbon-carbon bond; and
a divalent hydrophilic group being composed of one aromatic ring, or being composed of a plurality of aromatic rings which are connected to each other via a linking group and/or carbon-carbon bond, wherein the linking group is a divalent hydrocarbon group, a divalent silicon-containing group, a divalent nitrogen-containing group, a divalent phosphorus-containing group, a divalent oxygen-containing group, or a divalent sulfur-containing group, and at least one of the linking group or the aromatic ring comprises an anion exchange group;
wherein the anion exchange resin comprises a hydrophobic unit being composed of the hydrophobic group alone, or being composed of a plurality of hydrophobic groups repeated via ether bond, thioether bond, or carbon-carbon bond;
wherein the anion exchange resin comprises a hydrophilic unit being composed of the hydrophilic group alone, or being composed of a plurality of hydrophilic groups repeated via ether bond, thioether bond, or carbon-carbon bond; and
wherein the hydrophobic unit and the hydrophilic unit are connected via ether bond, thioether bond, or carbon-carbon bond;
wherein the hydrophilic group comprises a linear oligophenylene group as shown in the following formula (2):

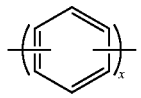

(2)

(In the formula, x represents an integer of 3 to 8).

2. The anion exchange resin according to claim 1, wherein the hydrophilic group is composed of a plurality of aromatic rings which are connected to each other via a linking group and/or carbon-carbon bond, wherein the linking group is a divalent hydrocarbon group, a divalent silicon-containing group, a divalent nitrogen-containing group, a divalent phosphorus-containing group, a divalent oxygen-containing group, or a divalent sulfur-containing group, and at least one of the linking group or the aromatic ring is connected to an anion exchange group via a divalent saturated hydrocarbon group having a carbon number of 2 or more.

3. The anion exchange resin according to claim 2, wherein the hydrophilic group comprises a fluorene residue as shown in the following formula (3a):

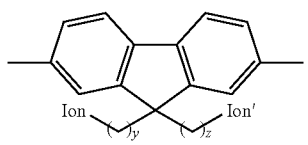

(3a)

(In the formula, Ion and Ion' are the same or different and represent an anion exchange group; and y and z are the same or different and represent an integer of 2 to 20).

4. An electrolyte membrane, comprising the anion exchange resin according to claim 1.

5. A binder for forming an electrode catalyst layer, comprising the anion exchange resin according to claim 1.

6. The anion exchange resin according to claim 1, wherein the hydrophilic group is composed of a plurality of aromatic rings which are connected to each other via a linking group and/or carbon-carbon bond, wherein the linking group is a divalent hydrocarbon group, a divalent silicon-containing group, a divalent nitrogen-containing group, a divalent phosphorus-containing group, a divalent oxygen-containing group, or a divalent sulfur-containing group, and at least one of the linking group or the aromatic ring is connected to an anion exchange group via a divalent saturated hydrocarbon group having a carbon number of 2 or more.

7. The anion exchange resin according to claim 6, wherein the hydrophilic group comprises a fluorene residue as shown in the following formula (3a).

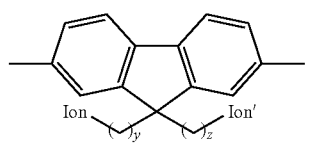

(3a)

(In the formula, Ion and Ion' are the same or different and represent an anion exchange group; and y and z are the same or different and represent an integer of 2 to 20).

8. The electrolyte membrane according to claim 4, wherein the hydrophilic group comprises a linear oligophenylene group as shown in the following formula (2).

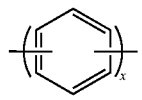

(2)

(In the formula, x represents an integer of 3 to 8).

9. The electrolyte membrane according to claim 4, wherein the hydrophilic group is composed of a plurality of aromatic rings which are connected to each other via a linking group and/or carbon-carbon bond, wherein the linking group is a divalent hydrocarbon group, a divalent silicon-containing group, a divalent nitrogen-containing group, a divalent phosphorus-containing group, a divalent oxygen-containing group, or a divalent sulfur-containing group, and at least one of the linking group or the aromatic ring is connected to an anion exchange group via a divalent saturated hydrocarbon group having a carbon number of 2 or more.

10. The electrolyte membrane according to claim 8, wherein the hydrophilic group comprises a fluorene residue as shown in the following formula (3a):

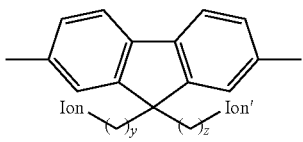

(3a)

(In the formula, Ion and Ion' are the same or different and represent an anion exchange group; and y and z are the same or different and represent an integer of 2 to 20).

11. The binder for forming an electrode catalyst layer according to claim 5, wherein the hydrophilic group comprises a linear oligophenylene group as shown in the following formula (2):

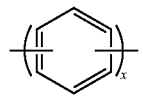

(2)

(In the formula, x represents an integer of 3 to 8).

12. The binder for forming an electrode catalyst layer according to claim 5, wherein the hydrophilic group is composed of a plurality of aromatic rings which are connected to each other via a linking group and/or carbon-carbon bond, wherein the linking group is a divalent hydrocarbon group, a divalent silicon-containing group, a divalent nitrogen-containing group, a divalent phosphorus-containing group, a divalent oxygen-containing group, or a divalent sulfur-containing group, and at least one of the linking group or the aromatic ring is connected to an anion exchange group via a divalent saturated hydrocarbon group having a carbon number of 2 or more.

13. The binder for forming an electrode catalyst layer according to claim 12, wherein the hydrophilic group comprises a fluorene residue as shown in the following formula (3a).

(3a)

(In the formula, Ion and Ion' are the same or different and represent an anion exchange group; and y and z are the same or different and represent an integer of 2 to 20).

* * * * *

UNITED STATES PATENT AND TRADEMARK OFFICE
CERTIFICATE OF CORRECTION

PATENT NO. : 10,727,515 B2
APPLICATION NO. : 16/044004
DATED : July 28, 2020
INVENTOR(S) : Kenji Miyatake et al.

Page 1 of 1

It is certified that error appears in the above-identified patent and that said Letters Patent is hereby corrected as shown below:

In the Claims

Column 38, in Claim 7, Line 3, after "(3a)", change "." to --:--.

Column 38, in Claim 8, Line 3, after "(2)", change "." to --:--.

Column 40, in Claim 13, Line 4, after "(3a)", change "." to --:--.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*